(12) United States Patent
Ott et al.

(10) Patent No.: US 10,897,641 B2
(45) Date of Patent: Jan. 19, 2021

(54) NOTIFICATIONS ON MOBILE DEVICES

(71) Applicant: Sourse Pty Ltd, Sydney (AU)

(72) Inventors: Maximilian Ott, New South Wales (AU); Lars Henrik Petander, New South Wales (AU)

(73) Assignee: Sourse Pty Ltd, Sydney (AU)

( * ) Notice: Subject to any disclaimer, the term of this patent is extended or adjusted under 35 U.S.C. 154(b) by 0 days.

(21) Appl. No.: 15/534,985

(22) PCT Filed: Nov. 30, 2015

(86) PCT No.: PCT/AU2015/050754
§ 371 (c)(1),
(2) Date: Jun. 9, 2017

(87) PCT Pub. No.: WO2016/090421
PCT Pub. Date: Jun. 16, 2016

(65) Prior Publication Data
US 2018/0270520 A1    Sep. 20, 2018

Related U.S. Application Data

(60) Provisional application No. 62/090,774, filed on Dec. 11, 2014.

(51) Int. Cl.
*H04N 21/258* (2011.01)
*H04N 21/442* (2011.01)
(Continued)

(52) U.S. Cl.
CPC .......... *H04N 21/258* (2013.01); *H04L 67/22* (2013.01); *H04L 67/26* (2013.01);
(Continued)

(58) Field of Classification Search
CPC .......... H04N 21/258; H04N 21/44218; H04N 21/4532; H04N 21/466; H04L 67/22;
(Continued)

(56) References Cited

U.S. PATENT DOCUMENTS 8,483,665 B2    7/2013    Kissinger et al.
2009/0113346 A1    4/2009    Wickramasuriya et al.
(Continued)

FOREIGN PATENT DOCUMENTS

WO    WO 2015/036518    3/2015

OTHER PUBLICATIONS

Extended European Search Reported dated Aug. 7, 2018 for Application No. 15866444.1, 10 pages.
(Continued)

*Primary Examiner* — Randy A Flynn
(74) *Attorney, Agent, or Firm* — Knobbe, Martens, Olson & Bear, LLP

(57) ABSTRACT

This disclosure relates to displaying notifications for content items on a mobile device to a user. A processor receives meta-data associated with the content item and receives context data indicative of a current context of the mobile device. The processor then determines a first value based on the meta-data, the context data and historical data indicative of historical interactions with historical notifications that are based on the meta-data, the first value being indicative of a current likelihood of the user interacting with a notification that is based on the meta-data. Finally, the processor sends first output data based on the first value to an output module to allow selectively outputting the notification based on the current likelihood. By selectively outputting the notification based on the current likelihood the notification can be withheld until the user is likely to interact with the notification.

18 Claims, 7 Drawing Sheets

(51) Int. Cl.
   *H04N 21/45* (2011.01)
   *H04N 21/466* (2011.01)
   *H04L 29/08* (2006.01)
   *H04M 1/725* (2006.01)
   *H04M 19/04* (2006.01)
   *H04W 4/029* (2018.01)
   *H04W 4/20* (2018.01)

(52) U.S. Cl.
   CPC ... *H04M 1/72547* (2013.01); *H04M 1/72569* (2013.01); *H04M 19/04* (2013.01); *H04N 21/44218* (2013.01); *H04N 21/4532* (2013.01); *H04N 21/466* (2013.01); *H04W 4/029* (2018.02); *H04W 4/20* (2013.01); *H04L 67/325* (2013.01); *H04L 67/327* (2013.01)

(58) Field of Classification Search
   CPC ..... H04L 67/26; H04L 67/325; H04L 67/327; H04M 1/72547; H04M 1/72569; H04M 19/04; H04W 4/029; H04W 4/20
   See application file for complete search history.

(56) References Cited

U.S. PATENT DOCUMENTS

| | | | |
|---|---|---|---|
| 2012/0096490 A1* | 4/2012 | Barnes, Jr. | G06Q 10/02 725/34 |
| 2012/0143806 A1 | 6/2012 | Sundelin et al. | |
| 2013/0159220 A1 | 6/2013 | Winn et al. | |
| 2013/0159408 A1 | 6/2013 | Winn et al. | |
| 2013/0316744 A1 | 11/2013 | Newham et al. | |
| 2014/0240122 A1 | 8/2014 | Roberts et al. | |
| 2014/0344050 A1* | 11/2014 | McKinley | G06Q 30/0267 705/14.45 |

OTHER PUBLICATIONS

Written Opinion dated Jan. 13, 2016 of International Application No. PCT/AU2015/050754 in 7 pages.
International Search Report dated Jan. 13, 2016 of International Application No. PCT/AU2015/050754 in 5 pages.

* cited by examiner

NOTIFICATIONS ON MOBILE DEVICES

CROSS-REFERENCE TO RELATED APPLICATIONS

This application is U.S. National Phase Application under 35 U.S.C. § 371 of International Application No. PCT/AU2015/050754 filed on Nov. 30, 2015, designating the U.S. and published as WO 2016/090421 A1 on Jun. 16, 2016, which claims the benefit of U.S. Patent Application No. 62/090,774, filed on Dec. 11, 2014, which are incorporated herein by reference.

TECHNICAL FIELD

This disclosure relates to displaying notifications for content items on a mobile device to a user.

BACKGROUND

Mobile push notifications are messages pushed from a server to a set of mobile devices and consequently shown to the user to potentially effect user behavior. For instance, an information provider wants to redirect the attention of the user to a relevant piece of information, or an application provider wants to prompt the user to interact with applications.

FIG. 1 illustrates a flow chart 100 of a prior art process. The process comprises the steps of receiving 102 a push notification from a server, displaying 104 a notification to the user, the user clicking 106 on the notification, displaying 108 the content item and launching 110 an application.

While notifications according to the prior art may be useful, the user experience is often plagued by a clutter of too many notifications. As a result, many users ignore notifications or uninstall apps from their devices, which is a problem for app and content providers.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF SUMMARY

A method for displaying notifications for a content item on a mobile device to a user comprises:
  receiving meta-data associated with the content item;
  receiving context data indicative of a current context of the mobile device;
  determining a first value based on the meta-data, the context data and historical data indicative of historical interactions with historical notifications that are based on the meta-data, the first value being indicative of a current likelihood of the user interacting with a notification that is based on the meta-data; and
  sending first output data based on the first value to an output module to allow selectively outputting the notification based on the current likelihood.

By selectively outputting the notification based on the current likelihood the notification can be withheld until the user is likely to interact with the notification. This leads to increased user satisfaction and user retention and avoids cluttering the display with unwanted notifications. For revenue generating applications, this also leads to higher revenue generated by the user.

Receiving context data may comprise receiving sensor data from one or more sensors associated with the mobile device.

Receiving sensor data may comprise receiving physiological data related to the user from one or more physiological sensors.

The method may further comprise determining the first output data based on the first value such that the output data indicates whether the current likelihood satisfies a predetermined condition for outputting the notification.

The method may further comprise selectively outputting by the output module the notification based on the first output data.

Sending the output data may comprise sending the first output data to a mobile device.

The historical data indicative of historical user interactions may comprise historical sensor data associated with the historical user interactions.

The first variable may comprise evaluating a decision model for the meta-data and the sensor data, the decision model being stored on a data store and comprising model parameters that are based on the historical data.

The method may further comprise:
  receiving input data indicative of a user interaction in relation to the notification;
  determining updated model parameters based on the sensor data and the meta-data; and
  storing the updated model parameters on a data store to allow evaluating the model comprising the updated model parameters.

User behavior can continuously increase the accuracy of the model. This way, the behavior of a new user can be learnt or a change in an existing user's behavior can be reflected in the model.

The meta-data may be indicative of one or more of:
  a type of the content item;
  a category of the content item;
  a size of the content item;
  a generation date of the content item; and
  an expiry date of the content item.

The sensor data may be related to a user control of the mobile device.

Receiving meta-data may comprise receiving meta-data by a processing computer device. Receiving context data may comprise receiving context data by the processing computer device. Determining the first value may comprise determining the first value by the processing computer device. Sending the first output data to an output module may comprise sending the first output data from the processing computer device to an output module of the mobile device.

The content item may be a video.

The method may further comprise:
  monitoring user input to detect a user interaction in relation to the notification; and
  upon detecting the user interaction in relation to the notification outputting the video on the mobile device.

The method may further comprise determining a second value based on the meta-data, the historical data, and the sensor data, the second value being indicative of whether a download opportunity is currently present; and sending second output data based on the second value to a download module to allow selectively downloading content data associated with the content item based on whether a download opportunity is currently present.

The method may further comprise downloading by the downloading module the content data from the content server onto the mobile device.

The steps of receiving the sensor data, determining the first value and sending the first output data may be performed upon completion of the downloading.

The method may further comprise:

determining a third value indicative of a point in time or period in time when the user is likely to interact with the notification, wherein the second output data is based on the point in time or the period in time to allow completion of the downloading before the point on time or period in time.

A non-transitory computer readable medium with an executable program stored thereon, when executed, causes a computer to perform the above method.

A computer system for displaying notifications for a content item on a mobile device to a user comprises:

an input port to receive meta-data associated with the content item and context data indicative of a current context of the mobile device;

a processor to determine a first value based on the meta-data, the context data and historical data indicative of historical interactions with historical notifications that are based on the meta-data, the first value being indicative of a current likelihood of the user interacting with a notification that is based on the meta-data; and an output port to send first output data based on the first value to an output module to allow selectively outputting the notification based on the current likelihood.

Optional features described of any aspect of method, computer readable medium or computer system, where appropriate, similarly apply to the other aspects also described here.

BRIEF DESCRIPTION OF THE DRAWINGS

FIG. 3b illustrates an example structure to implement the method of FIG. 3a.

DETAILED DESCRIPTION

While notifications allow an application to get the user's attention and potentially prompt the user to re-engage with said application, badly timed or currently non-relevant notifications may annoy the user and result in the user not using the app or even uninstalling it. Choosing the proper timing of posting a notification is therefore important in increasing the user's engagement with an application and in turn increase the revenue the user will generate for the application provider and also lead to better retention.

One key to good timing is selecting the right situation, or context to show a notification with a given content, such as news or sports. The current context of the mobile device and its user can be predicted from the sensor data collected on the device.

Notifications may involve a visual component on the task bar or another easily viewable part of the user interface of a mobile device and are sometimes accompanied by an audio or vibration alert. Further, the notification can be shown on another device associated with the mobile device 200, such as a smart watch. The visual component of the notification can be text based or it can include multimedia content, such as images, audio or video. Opening or clicking the notification may trigger various actions, such as playback of the video, or opening a specific application and bringing it to the forefront, or various combinations in parallel or sequentially.

Showing these notifications enables the user to quickly discover new information from applications without having to open them to check if there is anything new available. From an application's point of view, these notifications allow an application to get the user's attention and potentially prompt the user to re-engage with said application. For example, a notification for a news headline from a news app can attract the user to open the news app when the user is waiting in a line at a bank.

Figure 1:
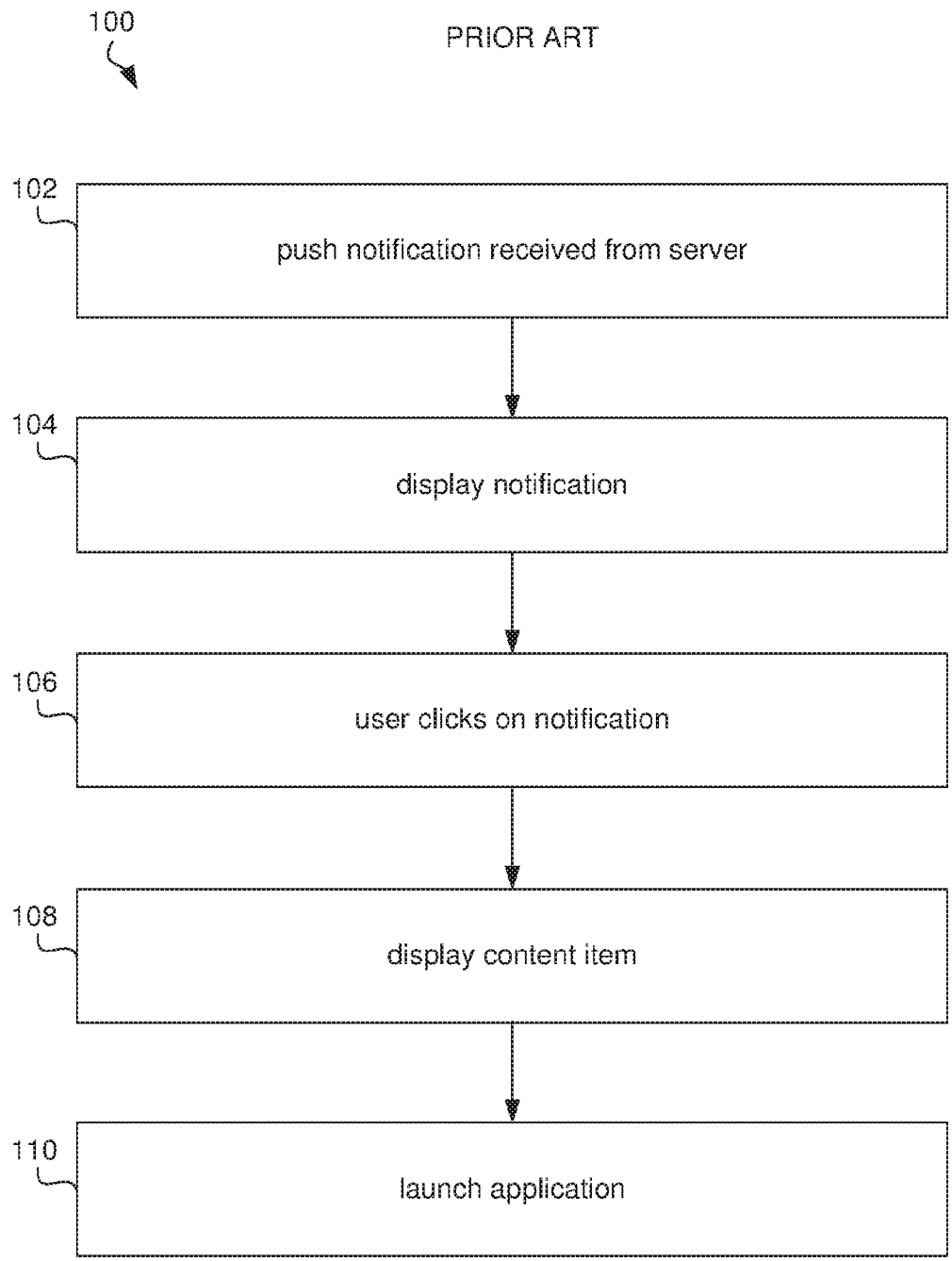
FIG. 1 illustrates a flow chart 100 of a prior art process. An example will be described with reference to FIG. 2 illustrates a mobile device.
Figure 2:
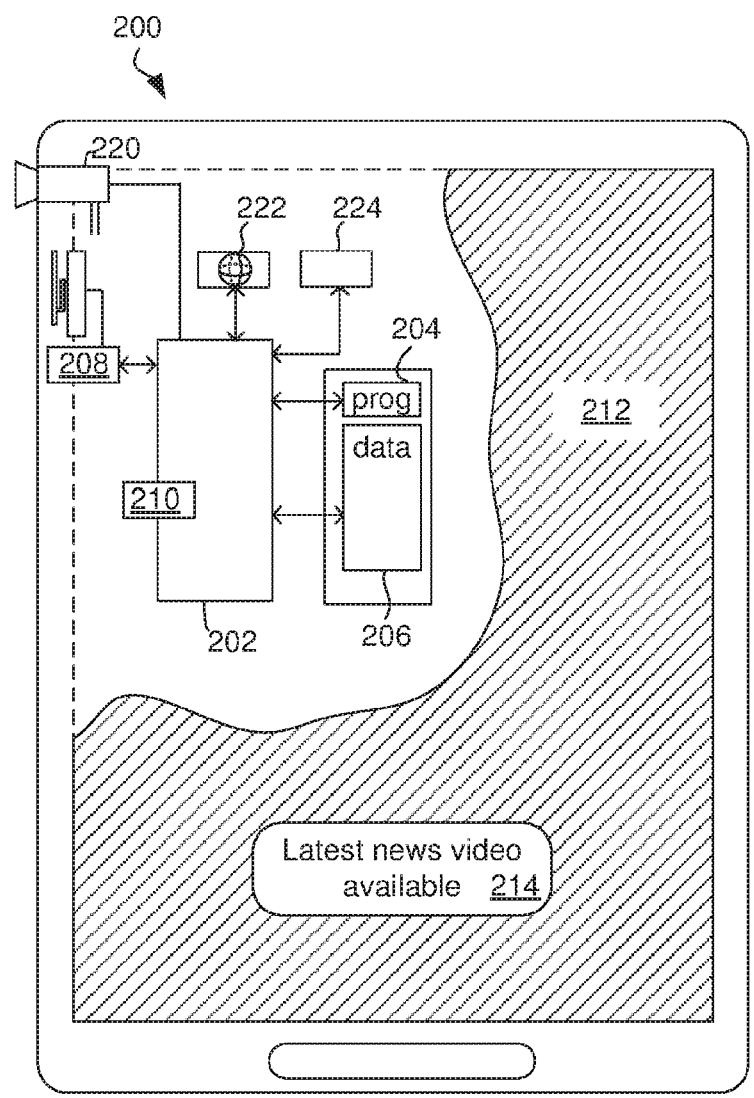

FIG. 2 illustrates a mobile device 200, such as a smart phone, for displaying notifications of content to a user. The mobile device 200 comprises a processor 202 connected to a program memory 204, a data memory 206, a communication port 208, such as a cellular network interface or Wi-Fi interface, and a user port 210 connected to a display 212. The program memory 204 is a non-transitory computer readable medium, such as a solid state disk or integrated Flash ROM. In other types of mobile devices, such as laptops, the program memory may be a hard drive, USB drive or CD-ROM.

Figure 3A:
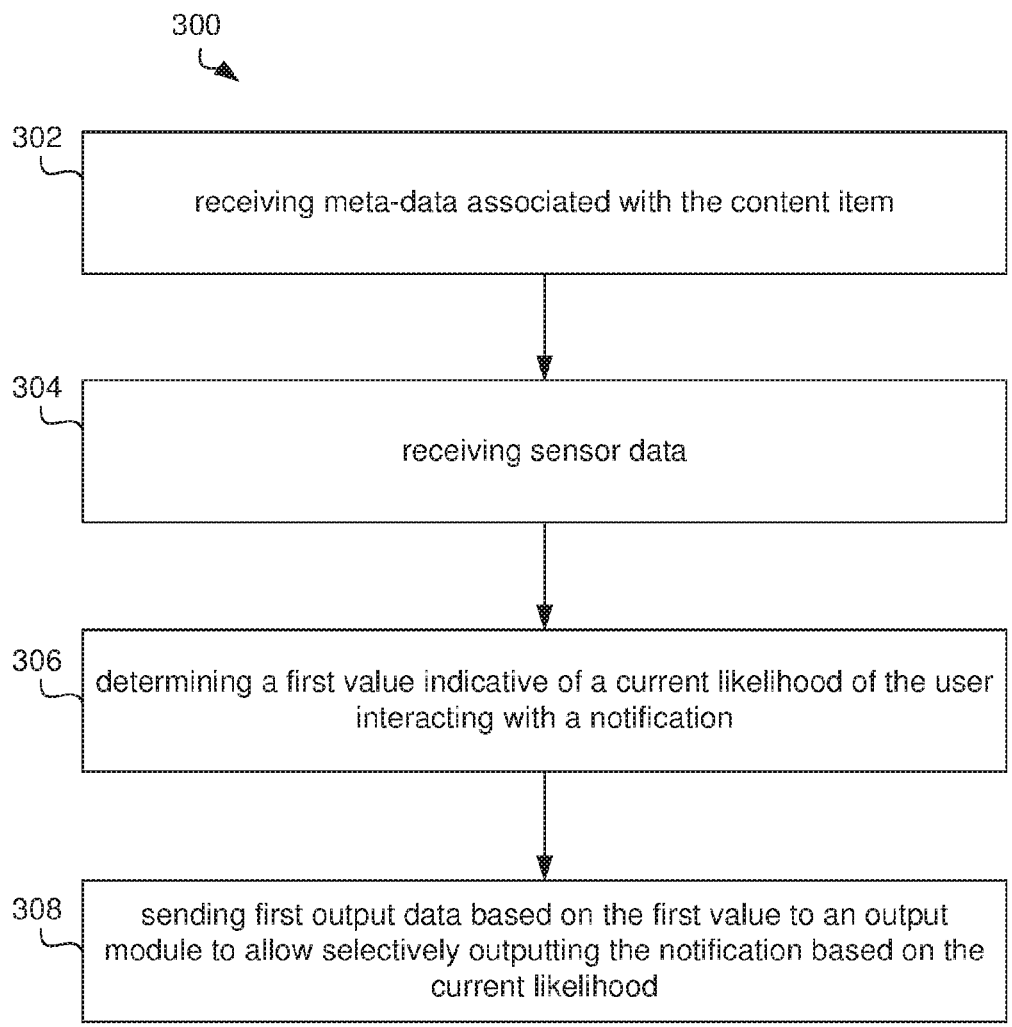
FIG. 3a illustrates a method for displaying notifications for a content item on the mobile device of FIG. 2.

Software, that is, an executable program stored on program memory 204 causes the processor 202 to perform the method in FIG. 3a, that is, processor 202 receives meta-data associated with a content item, receives sensor data, determines a likelihood of user interaction with a notification and causes outputting of the notification if the likelihood is high enough. The process may also select the modality and presentation of the notification based on the likelihood. These modalities can include only showing a visual notification in the notification center, lock screen, other user interface element of the device or an external device, or showing a visual notification together with an audio or vibration component. The presentation for visual component can vary by including text, image, video or animation elements and the choice of these elements. As a result, a notification 214 is displayed on screen 212 via user port 210. If the likelihood is not high enough, the method is repeated at a later time based on the sensor data at that time until the likelihood is high enough or the content item is expired.

The processor 202 may then store a decision value that is indicative of the likelihood on data store 206, such as on RAM or a processor register. Processor 202 may also send the sensor data or the determined value via communication port 208 to a server.

Mobile device 200 further comprises a GPS sensor module 222, inertial sensors 224 and an optical sensor 220, such as a camera or brightness sensor. Mobile device 200 may comprise further sensors, such as temperature, air pressure, radiation and an acoustic sensor, such as a microphone.

The processor 202 may receive data, such as sensor data or historical interaction data, from the sensors directly or from data memory 206 as well as from the communications port 208 and the user port 210, which is connected to a display 212 that shows a notification 214 of the available content a user. In one example, the processor 202 receives sensor data via communications port 208, such as by receiving date and time data over a Wi-Fi network according to IEEE 802.11. The Wi-Fi network may be a decentralized ad-hoc network, such that no dedicated management infrastructure, such as a router, is required or a centralized network with a router or access point managing the network.

In one example, the processor 202 receives and processes the sensor data in real time. This means that the processor 202 determines the value indicative of whether a user is likely to interact with a notification every time sensor data is received from sensors 220, 222 and 224 and completes this calculation before the sensors 220, 222 and 224 send the next sensor data update.

Although communications port 208 and user port 210 are shown as distinct entities, it is to be understood that any kind of data port may be used to receive data, such as a network connection, a memory interface, a pin of the chip package of processor 202, or logical ports, such as IP sockets or parameters of functions stored on program memory 204 and executed by processor 202. These parameters may be stored on data memory 206 and may be handled by-value or by-reference, that is, as a pointer, in the source code.

The processor 202 may receive data through all these interfaces, which includes memory access of volatile memory, such as cache or RAM, or non-volatile memory, such as an optical disk drive, hard disk drive, storage server or cloud storage. The mobile device 200 may further be implemented within a cloud computing environment, such as a managed group of interconnected servers hosting a dynamic number of virtual machines.

It is to be understood that any receiving step may be preceded by the processor 202 determining or computing the data that is later received. For example, the processor 202 pre-processes the sensor data, such as by smoothening, and stores the result in data memory 206, such as RAM or a processor register. The processor 202 then requests the data from the data memory 206, such as by providing a read signal together with a memory address. The data memory 206 provides the data as a voltage signal on a physical bit line and the processor 202 receives the pre-processed sensor data via a memory interface.

FIG. 3a illustrates a method 300 as performed by processor 202 for displaying notifications for a content item on a mobile device. FIG. 3a is to be understood as a blueprint for the notification software program and may be implemented step-by-step, such that each step in FIG. 3a is represented by a function in a programming language, such as C++ or Java. The resulting source code is then compiled and stored as computer executable instructions on program memory 204.

Method 300 may be performed by processor 202 of mobile device 200 or by a different processor of a server connected to the mobile device via a cellular network, Wi-Fi or combination thereof.

Figure 3B:
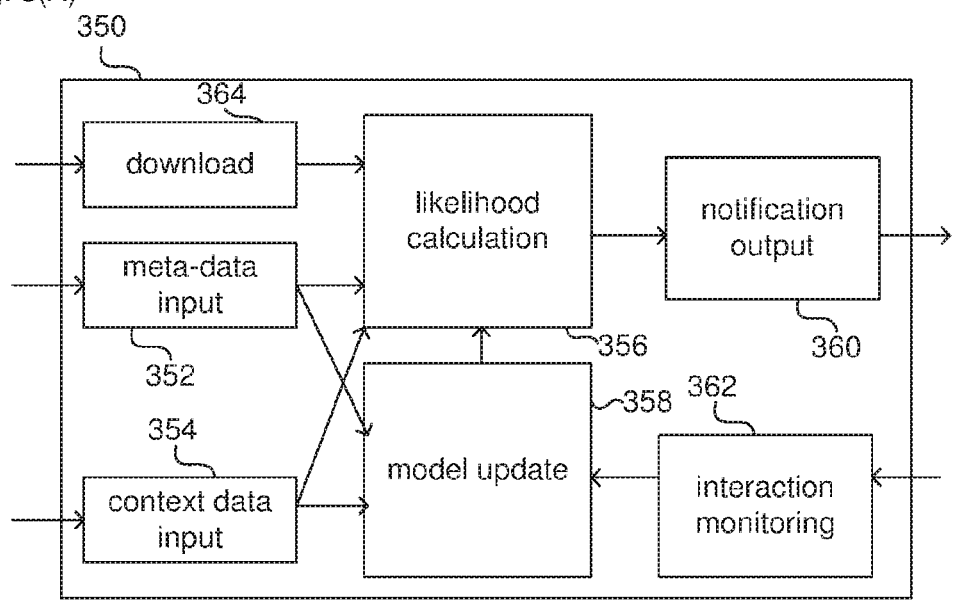

FIG. 3b illustrates an example structure 350 to implement the method of FIG. 3a. The structure 350 comprises several modules and each module may be implemented as a source code file, function or class, a compiled library installed on program memory 204 or a dedicated integrated circuit. In the example of a software implementation, when reference is made to a particular module performing a particular action, it is to be understood that processor 202 executes that software module to perform that action.

Figure 4:
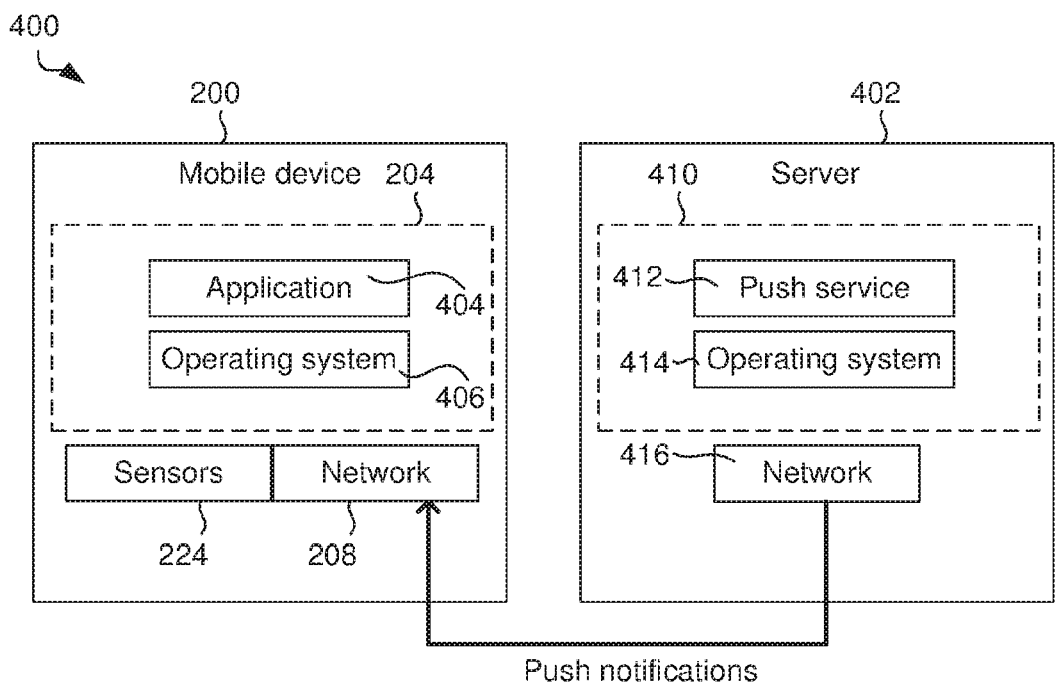
FIG. 4 illustrates a computer network comprising the mobile device from FIG. 2 and a content server.

FIG. 4 illustrates a computer network 400 comprising the mobile device 200 from FIG. 2 and a content server 402. Content server 402 may be a content management server 402 rather than a content hosting server because the content data itself may be stored on a different hosting server or provided by a content distribution network (CDN). However, server 402 determines whether new content is available and what type of content is available.

As described above with reference to FIG. 2, mobile device 200 comprises data memory 204. FIG. 4 shows data memory 204 in more detail and in particular, shows an application 404, such as a notification application or a video player application, and an operation system 406 both installed on program memory 204. The application 404 may be an app provided by an app store and the operating system may be Android, iOS or any other mobile device operating system. Other technologies, such as Web-applets or dynamic websites may also be used to display notifications.

Server 402 also comprises a data memory 410 on which is installed a push service 412 and a server operating system 414, both of which are executed by a server processor (not shown). Server 402 further comprises a network interface 416. When in use, server 402 processes content items and generates push notifications, which means that in this example, the mobile device 200 does not periodically query the server 402 for notifications but instead the server 402 can push notifications when they are generated by the push service 412. In other examples, mobile device 200 periodically sends a request for new content items.

A response from server 402 comprises one or more data packets that contain meta-data describing a respective content item. The term content item is a logical descriptor for any piece of content that can be individually accessed by the user, such as a video, image, installable application or general data file. The content item is physically represented by content data, that is, the actual payload, such as video frames or pixel data, as well as meta-data that provides characteristics of the content item, such as

- a type of the content item (video, image, application);
- a category of the content item (news, fun, sports, games);
- a size of the content item (in MB);
- a generation date of the content item ('yesterday', 'last week'); and
- an expiry date of the content item ('tomorrow', 'in one week', none).

Any type of content item, such as a video, may be an advertisement.

Referring back to FIGS. 3a and 3b, a meta-data input module 352 receives 302 the meta-data associated with a content item, which means that application 404 on the mobile device 200 is informed of available content by the server-based component 412. For an illustrative example, meta-data input module 352 receives a data message indicating that a sports video is available for download, that is, the meta-data contains 'sport' as a category and 'video' as a content type. As described above, the meta-data input module 352 may receive the meta-data from content server 402, from the data store 206 of mobile device 200 or from a processor register after determining or extracting the meta-data from the data message.

Further, a context data input module 354 receives 304 context data indicative of a current context of the mobile device. In some examples, the context data comprises sensor data and the context data input module 354 receives the sensor data from one or more sensors 222 and 224 associated with the mobile device. For example, sensor data input module 354 receives the GPS position and time of day from sensors 222 and 224. Sensor data input module 354 may also receive sensor data from other mobile devices and non-mobile devices, such as fixed sensors in the environment accessible via Bluetooth, Wi-Fi or the Internet.

Context data may also comprise weather forecast data or stock market data received over the Internet. Further, context data may comprise data related to activities of the user with device 200. For example, the context data may be indicative of which applications are currently open or with which applications the user interacts, whether the user enters any text, whether the user interacts with or touches the screen, how many times or how long the user has touched the screen in a preceding period of time, such as 5 seconds, or whether the user is in a lean back or lean forward position.

Receiving context data may also comprise monitoring the user's facial expression using camera 220 to detect user reaction. The received context data may then comprise the values of Boolean variables userHappy, userTalking and userLookingAtScreen.

It is to be understood that where the following examples refer to sensor data other context data may equally be used if applicable. Context data may also comprise data on network status, such as network availability for each network type, network load and device battery status.

In order to decide whether to display a notification for the content item, a likelihood calculation module 356 determines 306 a decision value based on the meta-data and the sensor data. The determination of the decision value in step 306 is further based on historical data, which is indicative of historical interactions with historical notifications that are based on the meta-data.

For example, the historical data comprises a record in an SQL database for each time the user interacts with a notification for a sports video, that is, the notifications of these records are based on the same or at least partly the same meta-data as the meta-data received in step 302. These records also comprise historical context data associated with historical interactions, such as GPS position information and the time of day of each of the interactions, past network status, such as network availability for each network type, network load and device battery status. This way, the historical data represents a pattern of the user behavior.

In another example, historical data is stored on data memory 206 in an aggregated form, such as in the form of coefficients of a learned model. For example, historical data may be stored in the form of logistic regression coefficients. By multiplying these coefficients with the sensor data and calculating the sum of the results, processor 202 determines a decision value based on the historical data. The coefficients can be updated incrementally with each new observation of sensor values, content meta-data and user reaction. This approach is called "online" learning.

In yet another example, the historical data or the coefficients may be based on interactions of multiple users with historical notifications. These multiple users may or may not include the user of device 200. For example, a third-party server, as will be explained with reference to FIG. 4, may determine the coefficients based on interactions of all users subscribed to the server and then send the coefficients to device 200. This way, the coefficients can be used as a starting point for further refinement based on interactions of the user with device 200.

The historical data may also comprise an indication of the degree of interaction of the user with the historical notifications. After the user interacts with the notification, such as by clicking on it, processor 202 monitors the user interaction with the associated application. For example, the user may spend a long time in the application associated with the notification, such as more than 10 minutes after clicking on the notification. This represents a high degree of interaction and therefore a higher significance. On the other hand, the user may simply swipe the notification away or briefly glance over the displayed information, which indicates a low degree of interaction. Processor 202 stores data indicative of the degree of interaction, such as the number of seconds of interaction or the number of screen touches within the application.

Based on this indication of the degree of interaction processor 202 may determine a weight assigned to that learning sample so that the learning model or rules can be updated by that sample based on the associated weight. As a result, more significant interactions influence the learning model or rules more than less significant interactions.

Likelihood calculation module 356 determines the decision value such that the value is indicative of a current likelihood of the user interacting with a notification that is based on the meta-data. 'Current' in this context means that the likelihood is valid for a certain period of time and until further sensor data is available. The sensor data may be acquired periodically, such as the time of day can be simply read from the timing module of processor 202. Other sensors, such as GPS sensor 222 may be activated less frequently.

For example, calculation module 356 may re-calculate the decision value every second, that is, the sensor data for time of day changes at each determination. However, the GPS data may remain the same until the GPS 222 sensor is activated the next time. In that example, the likelihood is current for one second.

It is noted that the term likelihood does not necessarily refer to likelihood in a strictly mathematical sense. Likelihood may be a measure of how likely the interaction occurs.

In other words, the likelihood can be reflected by values from 0 to 10, by descriptors 'low', 'medium' and 'high' or other representations.

In one example, processor 202 determines multiple decision values based on the meta-data, the sensor data and the historical data. Each of the multiple decision values is indicative of a current likelihood of the user interacting with a particular type of notification. Based on the multiple decision values, processor 202 may choose one type of notification, such as by selecting the type associated with the maximum decision value.

Different decision values may relate to different presentation or layouts of notifications or to different notification modalities or mechanisms, such as audio, vibration, visual only, on smartwatch/smart eyeglasses based on the respective likelihood.

Processor 202 may determine the one or more decision values for each of multiple content items, such that in effect, processor 202 selects one content item for generating a new notification by selecting the content item with the maximum decision value.

The decision value may be a probability of user interaction determined by a logistic regression model using the received sensor and meta-data as input feature values and a binary variable representing user interaction True/False as the classification/output variable. The logistic regression model is trained by the historical interaction records and therefore, determining the decision value is said to be "based on" the historical interaction records.

Likelihood calculation module 356 then sends 308 output data based on the decision value to an output module 360 to allow selectively outputting the notification based on the current likelihood. In one example, the output data is identical to the decision value. In other examples, the output data comprises a binary True/False variable that indicates directly whether or not to display a notification, that is, processor 202 may determine the output data by checking the decision variable against a predetermined condition, such as by comparing the decision variable to a threshold, such as 50% probability of interaction.

Selective outputting of notification can refer to a binary choice of showing a single notification based on a likelihood value. It can also refer to the output module 360 choosing between multiple content items each with a distinct likelihood value and displaying one or more notifications with the highest likelihood value. Output module 360 may order or arrange these multiple notifications based on their likelihood. By repeatedly determining the likelihood value, the output module 360 in effect waits until the likelihood for the highest scoring content item exceeds a threshold value.

Likelihood calculation module 356 may re-evaluate the decision to display a notification at a later time, when the context has changed, even after output module 360 has displayed the notification, if the user has not seen the notification yet or no user interaction in relation to the notification has been detected by the interaction monitoring module 362. Interaction monitoring module 362 determines whether the user has seen the notification by inspecting hardware sensors and user interactions with the device, for instance, the screen activation state or the screen lock state. This re-evaluation can prompt the output module 360 to remove the notification or replace the notification with another notification for a different content item or another notification for the same content item using a different modality or presentation.

The output module 360 may be another module of processor 202 itself or part of an app installed on program memory 204 that controls the display of notifications. If the output module 360 receives a showNotification=True binary value to indicate that the likelihood of the user interacting with a notification is sufficient, the output module 360 outputs the notification, such as by displaying the notification 214 on screen 212. Receiving a showNotification=False value does not lead to a display of the notification.

In the example of an Android operating system, the output module 360 may be implemented based on the following code:

```
if (showNotification) {
    Notification noti = new Notification.Builder(mContext)
        .setContentTitle("New video")
        .setContentText(videoTitle)
        .setSmallIcon(R.drawable.new_video)
        .setLargeIcon(aThumbnail)
        .build( );
    mNotificationManager.notify("newVideo", noti)
}
```

Although the above example is given in the context of a mobile device and processor 202 performs method 200 by executing the software modules in FIG. 3b, it is noted that equally a server could receive the meta-data from a content server, receive the sensor data from the mobile device 200, determine the decision value and send the output data back to the mobile device 200 to allow the mobile device to selectively display the notification based on the current likelihood of the user interacting with the notification. This way, the server 402 may also have the modules of FIG. 3b installed on its program memory.

The structure 350 may also comprise an interaction monitoring module 362 to monitor the user interaction with a generated notification, a model update module 358 to update a decision model based on the user interaction and a download module 364 to download the content data.

In one example, download module 364 downloads 304 the content data onto the data memory 206 of the mobile device 200. The data memory 206 may also be a memory card, USB, Wi-Fi or other memory associated with the mobile device 200. Only when the download is completed, processor 202 determines the decision value.

In one example, download module 364 does not download the content data immediately but waits for an optimal download time. To this end, processor 202 determines a download decision value based on the meta-data, the historical data, and the sensor data. The download decision value is indicative of whether a download opportunity is currently present. Processor 202 then sends download decision output data based on the download decision value to download module 364. This allows the download module 364 to selectively download content data associated with the content item based on whether a download opportunity is currently present. Processor 202 may use the same decision model or different decision models to determine the download decision value and to determine whether to display the notification.

The download module 364, such as a download manager installed on program memory 204, then downloads the content data from the content server onto the data memory 206 of the mobile device 200.

In one example, processor 202 waits for the download to finish before initiating method 300 in FIG. 3a.

Sensor data may refer to hardware sensors, but processor 202 can also treat the user's interaction with the device as well as the behavior of applications as additional sensors providing sensor data that contains information on the current context. In addition, processor 202 can often also directly or indirectly derive from these context data the user's behavior in responding to posting a notification. For example, if the desired behavior is for the user to open a specific application, processor 202 measures if and when a user opens said application, which provides direct evidence. An indirect example would be to monitor device sensors, such as the user locking the display right after being shown a notification.

Figure 5:
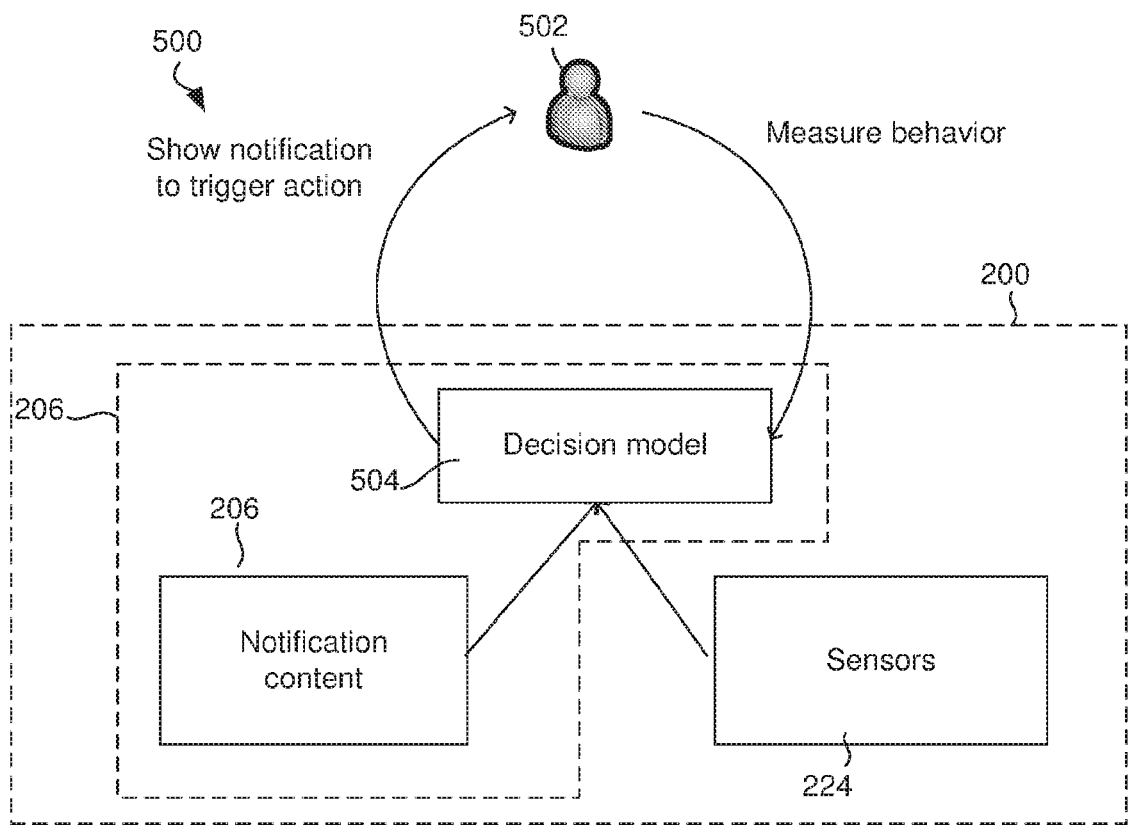
FIG. 5 illustrates a schematic of the interaction between the mobile device from FIG. 2 and a user.

FIG. 5 illustrates a schematic 500 of the interaction between the mobile device 200 and a user 502. Stored on data memory 206 is a decision model 504 in the form of values of model parameters, such as weights of a weighted sum of inputs. Notification content meta-data 206 is pushed to the mobile device 200 and processor 202 evaluates the decision model 504 for the current input data, which also comprises sensor data from sensors 224. Processor 202 evaluates the decision model 504 by calculating the weighted sum of inputs where the weights are based on current and history of sensor information as well as user behavior measurements. The result is the decision value described with reference to step 306 of method 300 in FIG. 3*a*.

For example, the time of day may be 8 pm and the GPS location may be 'home'. In this example, the 'sports' tag may be associated with a weight value of 20, the 'video' tag with a weight value of 10, time of day between 6 pm and 10 pm has a weight of 30 and 'home' location has a weight of 80. Then, since the feature values are either 1 or 0, the resulting decision value is the sum of the weights and equals 140.

Based on the result of the decision model 504, processor 202 will decide which notification content to show to the user 502 at what time. If the notification threshold is 200, processor 202 does not show the notification. If the notification threshold is 100, processor 202 does show the notification.

Consequently measured user behavior and its comparison with the desired user behavior associated with the shown notification may lead to changes in the decision model parameter values as calculated by model update module 358 in FIG. 3*b*.

In addition, processor 202 downloads the content first to maximize user experience. In one example, processor 202 determines a download decision value using the same or a different decision model, which provides an estimated future time for notification. That is, processor 202 determines a value indicative of a point in time or period in time when the user is likely to interact with the notification. This time span can be used by an Intelligent Download Manager installed on program memory 204 to choose the right time and communication channel to download said content according to various objectives. Examples of these objectives are minimizing cost or network impact. PCT/AU2012/001296 discloses a mobile content delivery system with recommendation-based pre-fetching.

Described herein is a mechanism that decouples the timing for pushing of notification metadata from the server to mobile devices from the timing for displaying the notification containing multimedia information to the user. This allows each device to first receive a push notification message from the server and then at a later time download multimedia rich content, such as video, when the device enjoys good network connectivity.

Further, it allows timing of the showing of the notification when the user is most likely to open the notification and the multimedia content will be on the device ready for playback. The benefits of this decoupling are 1) The possibility of using high quality content that takes time to download as a part of the notification, thus increasing the engagement of the user, and 2) Personalized timing of the notification to match the user's behavioral patterns, further increasing the user's engagement with the notification.

Further, more flexible timing of the download of rich multimedia content reduces the network cost of delivering the service and allows taking advantage of server and network spare capacity.

Push Notification Process

The notification system consists of a content management server 402 that sends a message to one or more mobile devices 200 containing meta-data describing the content items, such as text to be displayed, images to be shown and resource locators of media to be downloaded.

Another example of method 300 of FIG. 3*a* will now be described. The processor 202 of each mobile device 200, upon receiving 302 this message performs the following steps: First, select what content should be downloaded. The content that the device downloads can be selected on the device to match the screen size, resolution and other capabilities of the device.

Next, the device 200 downloads selected content that can be downloaded using the current network to which the device 200 is connected. What can be downloaded can depend on many factors, such as the network type, network operator, content type, content size, application which the notification is associated with, time of day, network or cell identifier or network load.

Then, if more content is required before the notification can be displayed, the device waits for a suitable download opportunity before downloading the content. Once a suitable download opportunity has been found to download all content required for the notification, the remaining content will be downloaded.

Once all the required content related to the notification is stored locally on the device, the device will monitor its sensors to find the best time to show the notification to the user by determining 306 a notification decision value calculated using a decision model that can be rule based or a learning model. The decision model can also enforce embargo and expiry time filters received in the meta-data. Processor 202 is programmed not to show notifications before the embargo time and after the expiry time. The decision to show 308 the content is then made using the notification decision value.

When a notification is shown, processor 202 monitors the user behavior either directly through interaction with notification and the application or indirectly through the sensors. Processor 202 can then update the decision model using the sensor data as feature values of the new learning sample. If the user behavior was as predicted by the model, the decision model can be left as it is or its beliefs reinforced. If the behavior was different than what the model expected, the model can be updated to become more accurate. Processor 202 then stores the updated model parameters on data memory 206. In one example, processor 202 performs the AdaBoost algorithm to updated the model.

In examples where the content item is a video, processor 202 may, upon detecting user interaction with the notification, start playback of the video.

Figure 6:
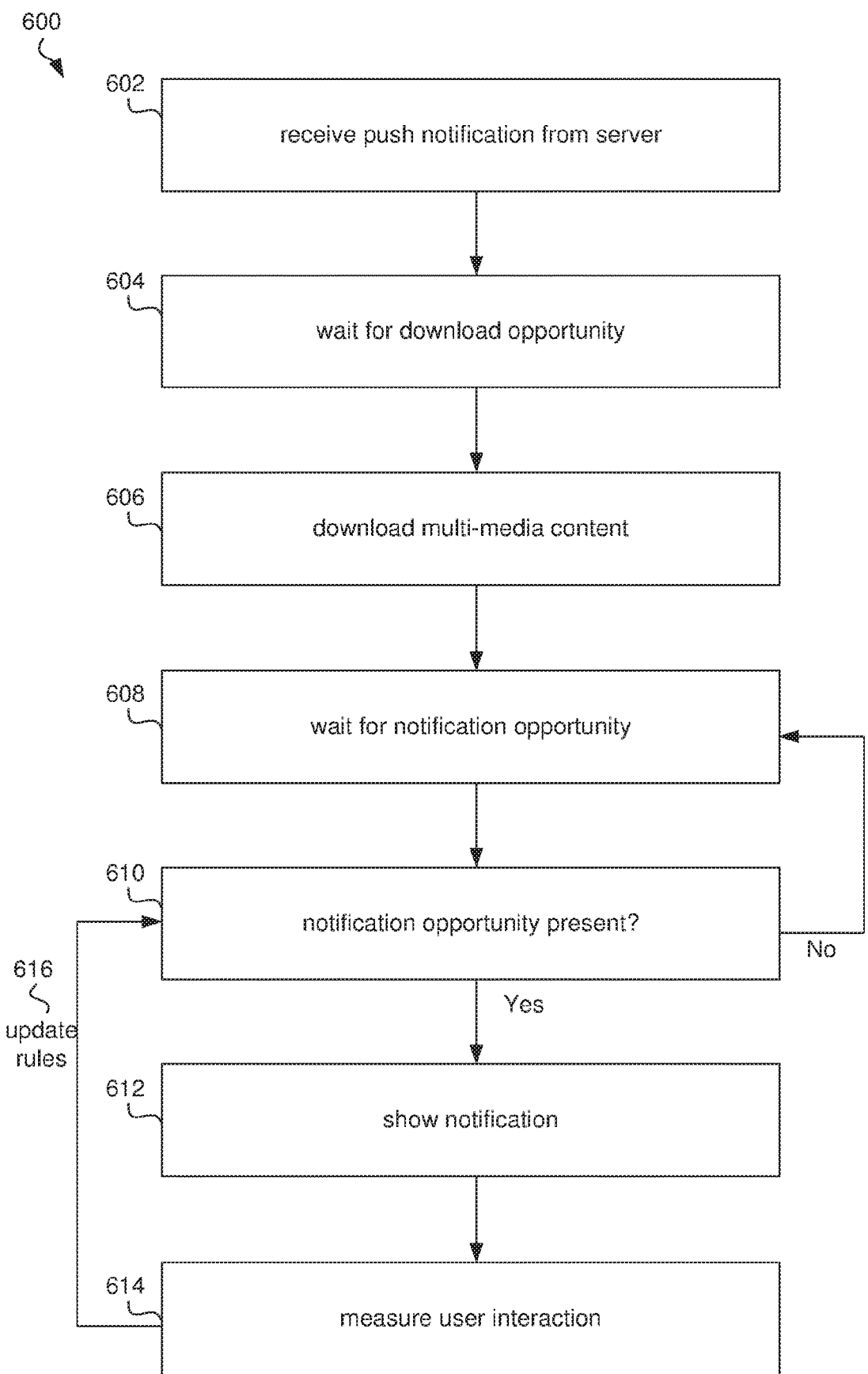
FIG. 6 illustrates an example of a notification process using a rule-based decision model.

FIG. 6 illustrates another example 600 of the notification process using a rule-based decision model. Processor 202 first receives 602 a push notification from server 402, waits 604 for a download opportunity and then downloads 606 the multi-media content data. Once the content data is downloaded, processor 202 waits 608 for a notification opportunity as previously described. Processor 202 reaches a decision block 610 from which, if no notification opportunity is present, processor 202 goes back to wait 608 for a notification opportunity. If a notification opportunity is present, processor shows 612 the notification and measures 614 user interaction. Based on the measured interaction, processor updates 616 the rules.

The decision model update 616 for a rule based model is done by choosing a suitable rule or set of rules that best predicts the user behavior. This choice can be done on the device 200 automatically, or on the server 402. The choice can be made on the server 402 automatically or triggered manually for one or multiple devices at a time based on behavior measurements uploaded by the devices. The measurements can be uploaded to the server either one at a time or in batches of multiple measurements.

An example rule may be if contentType="video" and category="news" and location="home" then showNotification="True"

In the above example, the statement showNotification="True" represents determining a decision value ("True") that is indicative of the current likelihood of the user interaction with a notification. That is, the value "True" indicates that the likelihood is high. Accordingly, the value "False" would indicate that the likelihood is low.

Figure 7:
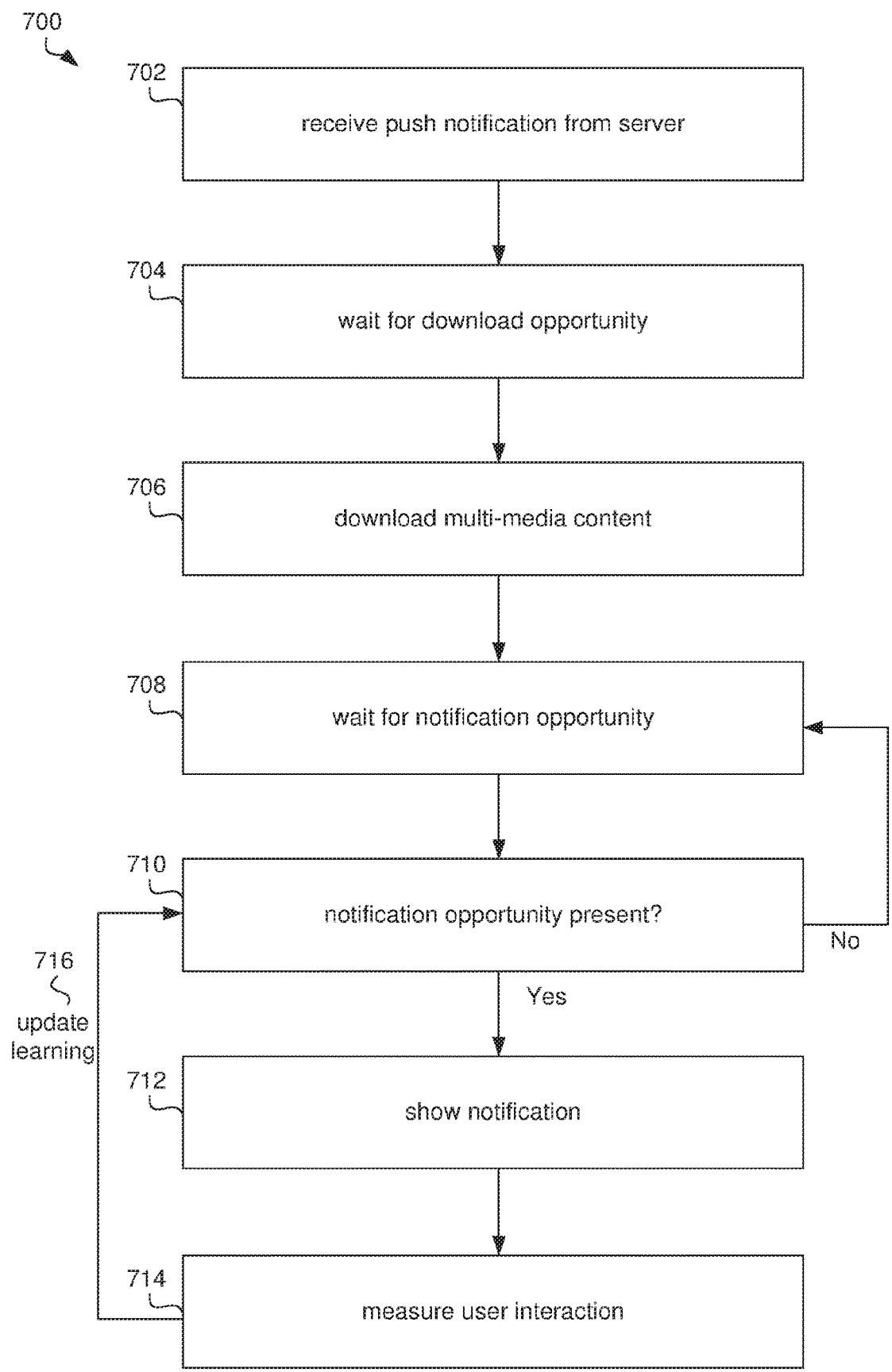
FIG. 7 illustrates another example of a notification process using a learning based decision model.

FIG. 7 illustrates a notification process 700 using a learning based decision model. Similar to the rule based model in method 600, processor 202 first receives 702 a push notification from server 402, waits 704 for a download opportunity and then downloads 706 the multi-media content data. Once the content data is downloaded, processor 202 waits 708 for a notification opportunity as previously described. Processor 202 reaches a decision block 710 from which, if no notification opportunity is present, processor 202 goes back to wait 708 for a notification opportunity. If a notification opportunity is present, processor shows 712 the notification and measures 714 user interaction. Based on the measured interaction, processor updates 716 the learning model.

A learning based decision model uses a machine learning algorithm, such as AdaBoost, which evaluates inputs based on a model trained on past inputs and user reactions to predict the user response. Thus, when using a learning based model, the user reaction is fed back to the decision model to update the learning. The behavior measurement can be additionally uploaded to a server for aggregate learning of the user behavior.

Deriving Features from Sensors and Other Inputs for Decision Model

The device sensors include time, location, accelerometer, microphone, light meter, camera, battery status, Wi-Fi access point name and address, surrounding Bluetooth devices, cellular network parameters, screen lock status, and local and remote software state.

The device sensors providing context data of the device may also include physiological sensors that sense physiological parameters of the user, such as a heart rate or blood pressure. These sensors may be integrated into consumer devices, such as a heart rate monitor that can be worn during jogging or may be medical sensors, such as a blood pressure cuff from a medical provider.

The monitoring can be done periodically by polling the sensors at fixed or variable intervals or it can be event driven, so that the sensor data collection is triggered by a change in the environment.

For example, events or interaction with user controls of the mobile device, such as the user unlocking the screen of the mobile device or an update from the location sensors could wake up processor 202. Such an event would trigger the processor 202 to collect the other sensor data to derive the features to evaluate the rule based decision model.

Processor 202 may transform the sensor data to features usable by a machine-learning algorithm. This transformation or mapping can include steps such as centering, scaling and reducing skewness of the data. It can also include mapping the sensor data to different domains, using methods such as the Fourier transform. Further, data from multiple sensors can be combined into higher-level features by applying logical or learned rules.

When predicting human reactions to notifications, processor 202 can derive high level features corresponding to human situations from the sensor data using logical rules or relationships in the observed data. For example, for predicting human behavior higher-level features, such as "at home", "at work", "in bus", "with family", can produce better results than using low-level raw data.

Features can also be related to the content. Processor 202 may derive these features from the notification meta-data, extracted from the content itself or obtained from other sources.

In addition to features derived from the content and sensors, the history of showing notifications, processor 202 may use the users reactions to recent notifications to derive additional features.

Processor 202 may use the features both in rule based and learning based decision models.

In one example, after downloading the content data for displaying a notification, processor 202 monitors sensor data and maps the data into features usable by the rule based decision model. Based on the rule based decision model processor 202 uses a set of rules to map features into decisions. For example, a rule could be: "if video for notification is not expired and not under embargo and the user is present on the device and at home, show video in a notification".

Processor 202 measures the user behavior in response to the notifications shown as a result of this rule and may upload these measurements to the server 402. If the user consistently ignores or discards the notifications, the server 402 may delete this rule, such as by an automatic process tracking the performance of the rules on each device. In one example, this approach is applied to a set of devices, so that server 402 pushes rules performing well in a set of devices to other devices and delete rules performing badly and replace them with new rules. Updating the rule may comprise the server pushing a file to the devices.

In another example, a processor 202 executes a learning based decision model using a machine learning algorithm to learn from the data. Processor 202 learns to predict outcomes (i.e. user reaction to notification) from features by evaluating a model trained with past feature-outcome combinations.

Figure 8:
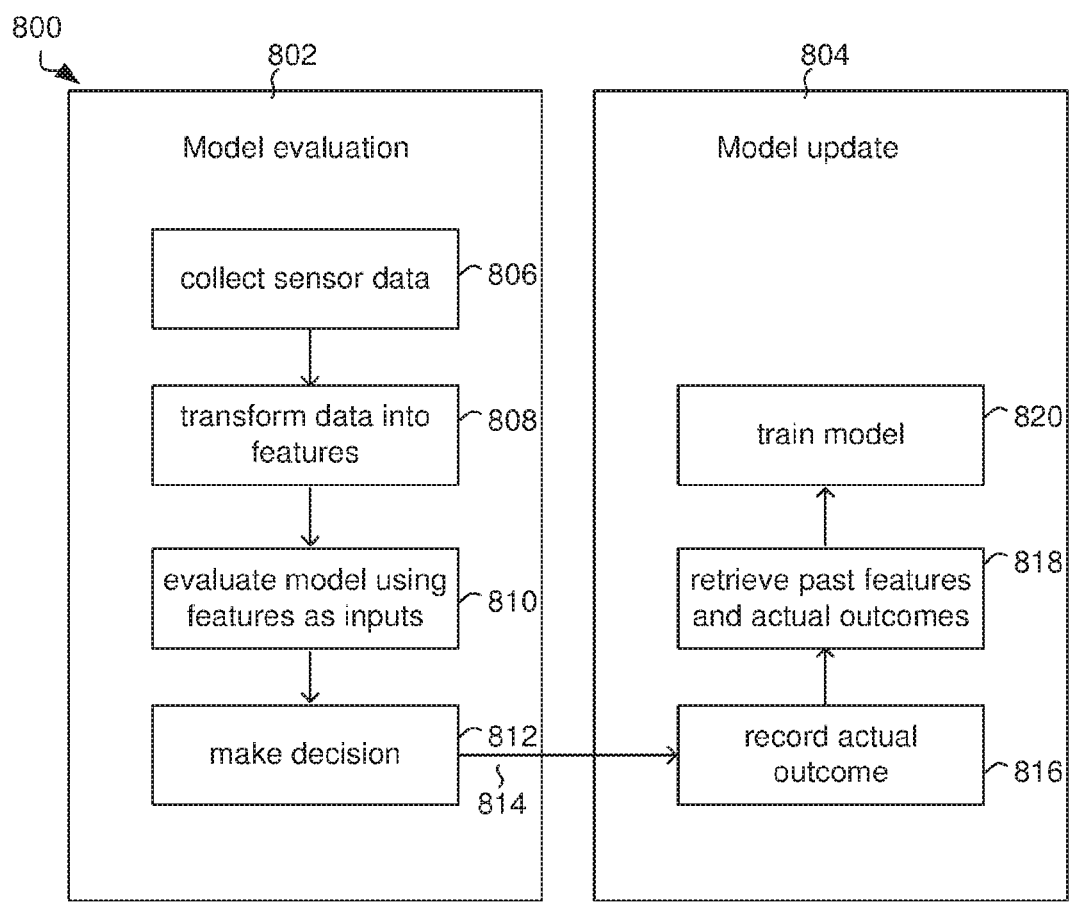
FIG. 8 illustrates software modules installed on the program memory from FIG. 2.

FIG. 8 illustrates another example of software modules installed on program memory 204 comprising a model evaluation module 802 and a model update module 804. By executing the modules 802 and 804 a machine learning based decision model can learn to predict user behavior in response to notifications. It is noted that in one example, the model update module 804 is installed on mobile device 200 while in other examples, the module update module 804 is installed on server 402.

The processor 202 of mobile device 200 or the processor of the server 402 trains a learning algorithm using collected features and the observed outcomes, i.e. how the user reacted when a notification was shown. The training data can include other user behavior in addition to user reactions to notifications. For example, usage patterns of relevant applications together with context information can be monitored. Before any training data is present preset values can be downloaded from the server and be used to configure the algorithm.

After the learning algorithm on the device is trained or configured, the system will then start monitoring 806 sensor data, derive 808 features from it and evaluate 810 the trained model to make a prediction. The outcome of the evaluation of the trained model is then used to make the decision 812 whether to show a given notification or not in a given context. This prediction outcome can be a probability of whether the user will open the notification or discard or ignore it. This probability can be used directly to make the decision or it can be combined with other data, such as a cost-benefit model for different reactions.

Processor 202 monitors the user interaction to detect an interaction in relation to the notification. When the user interacts with the notification, processor 202 sends 814 the current sensor data and extracted features to server 402. The server 402 records 816 the received outcome and retrieves 818 past features and actual outcomes in order to train the model 820, that is, to update the model by the received data relating to the user interaction.

The steps in making the decision based on sensor data can be performed either on mobile device 200 or on server 402. In the first case, the decision process can run on the mobile device 200 locally and minimize the latency and network and power usage of the decision process.

In the server-assisted case, the collected sensor data is uploaded from the mobile device 200 to the server 402. The server 402 then performs the prediction and decision steps and informs the device 200 on the result. Further communication between mobile device 200 and the server 402 may be performed in the prediction step. This approach has the benefit of offloading the computation of evaluating and training the decision model. Further, it allows aggregation of the learning models across multiple devices.

Using a Utility Model to Convert Prediction Into Decision

Processor 202 evaluates the trained machine learning model to make a prediction. Processor 202 then converts the prediction outcome into a decision of whether to show a notification to a user or not.

If the outcome of the prediction is a probability or a value that can be interpreted as a probability, processor 202 can use a threshold for the probability. For example if the predicted probability of the user opening the notification would need to be over 60%, before showing the notification to reduce the irritation of the user from showing notifications at marginal times. The threshold value can be chosen to maximize the expected utility that is the difference between the benefit of having the user open the notification and the cost of interrupting the user.

Processor 202 can quantify the cost of a false positive i.e. a user being shown a notification that he does not open, by measuring the negative effects of a user discarding or ignoring notifications in terms of a decrease in the expected user lifetime value from higher probability of user uninstalling the application or other metrics. Further, processor 202 can quantify the benefit of a true positive, i.e. the user opening the notification, by measuring the positive effects of a user opening a notification in terms of an increase in lifetime revenue from more active engagement with the application or other metrics. An opportunity cost is incurred for a false negative, i.e. not showing a notification when the user would open it. This may equal the benefit from a true positive. A true negative, i.e. not showing the notification when the user would not open it, may have no benefit or cost.

Processor 202 can calculate the expected utility of showing the notification by combining the cost of the false positive and the benefit of the true positive with the predicted probability of the user opening the notification. Processor 202 then shows the notification, if the expected utility is above zero.

For example, if the estimated probability of user opening the notification is 50%, the cost of a false positive is 0.7, and the benefit of true positive is 1, then the expected utility of showing the notification is: $0.5*1-(1-0.5)*0.7=0.3$. Hence, the decision in this case is to show the notification.

A threshold value for the probability can be calculated given the cost and benefits of true and false positives. The threshold is calculated by evaluating at what probability the expected costs and benefits would match. In the example above, that probability threshold would be calculated to be 0.41 by solving X in equation: $X*1=(1-X)*0.7$. Then, a notification will be shown if the outcome of the prediction is higher than the threshold.

In one example, the mobile device 200 receives a push notification for a news video at 9 AM with an expiry in 12 hours. The short time before expiry is combined with a download policy that defines that the video can be downloaded over cellular networks between 11-12 AM, if there is enough battery on the device. This time window has been chosen by the service provider to match a lower load in the cellular network based on network load history.

Processor 202 then waits until the conditions in the policy are fulfilled and downloads the video clip and a thumbnail image of the video at 11:03 AM. After this, processor 202 waits for a notification opportunity with a high probability of the user opening the notification.

Processor 202 uses a learning based decision model for showing the news related notifications that shows the notification if the user is likely to open the notification at the time and the notification is not expired. Over the last 30 days, processor 202 has continuously updated the learning based decision model to train it with the following features from the last 30 days to learn to predict the user behavior in response to a notification: type of news, time of day, day of week, portion of active applications belonging to "non work" group of applications. The "non work" applications for the user include all applications except email, phone dialer, and text messaging service.

The training has been performed by processor 202 periodically using sensor data collected when the user has been using the news application and when notifications have been shown. Performing the training, processor 202 used the reaction of the user to the news videos in the application and the notifications to train a decision tree using the features defined above.

Processor 202 uses a utility model to turn the predictions into decisions. Processor 202 measures features across all users of the news application, opening the notification increased daily engagement by 1% and discarding or ignoring it reduced daily engagement by 0.7%. Then, processor 202 calculates the threshold for prediction outcome by solving X from the equation: $X*1=(1-X)*0.7$. Thus, processor 202 uses a threshold of 0.41, so that a notification is shown when the prediction outcome exceeds 0.41. Server 402 may perform this calculation based on analytics data collected on user behavior. The mobile devices are then configured with the threshold value.

At 12:35 PM, processor 202 receives a signal from the mobile operating system that the user unlocked the screen. It then waits 15 seconds to learn how the user is using the device by capturing the list of active and background applications. The user presence and the last 3 applications used along with the time of day and day of week are fed into the decision tree algorithm. The last three applications are all non-work related, social networking and web content related application. The time of day indicates that the user is on his lunch break and the day of week suggests that it is a workday. The topic of the news video is basketball, which the user has been following. The decision tree stored on the data memory 206 indicates that the user is likely to open a notification and watch a basketball related video in this situation with a probability of 0.76. Processor 202 shows the notification to the user, since the probability is above the decision threshold 0.41.

The task bar of the device 200 then shows a notification and when the user opens the notification center, the user sees a thumbnail of the news video, which captures his attention and he clicks on it. The downloaded news video starts playing. After it finishes, the system launches the news application so the user can see background to the news video and related news items.

In another example, the processor 202 receives a push notification for a high definition video promoting new content in a game that is installed on the device at 9 AM on day 1 with an embargo ending in 2 days. Processor 202 combines the embargo with a download policy that defines that the video can be downloaded only over cellular networks between 23 PM-5 AM after 24 hours of waiting for Wi-Fi or over Wi-Fi networks anytime, if the device is charging. This time window has been chosen by the service provider to match the lowest load in the cellular network based on network load history.

Processor 202 then waits to find a Wi-Fi network and sets a timer to wake up the device at the earliest allowed cellular download time with a random delay added to it to avoid synchronous downloads. However, the user does not have Wi-Fi access at home or at his office. After waiting for Wi-Fi from 9 AM on day 1 at 23:58 on day 2 the timer wakes up the device and it can download the video and the associated thumbnail for it over a cellular network. After this, the device 200 waits for a notification opportunity with a high probability of the user opening the notification.

Processor 202 accesses a rule from data store 206 for showing the game related notifications: "When the user is present on the device and not answering a phone call, show notification, if it is not in embargo". At 9:15 AM, processor 202 receives a signal from the mobile operating system that the user unlocked the screen. It checks that it has a notification to show, which is not under embargo and then waits 15 seconds, confirms that the user is not answering a phone call by checking what the active application is and shows the notification.

Figure 9:
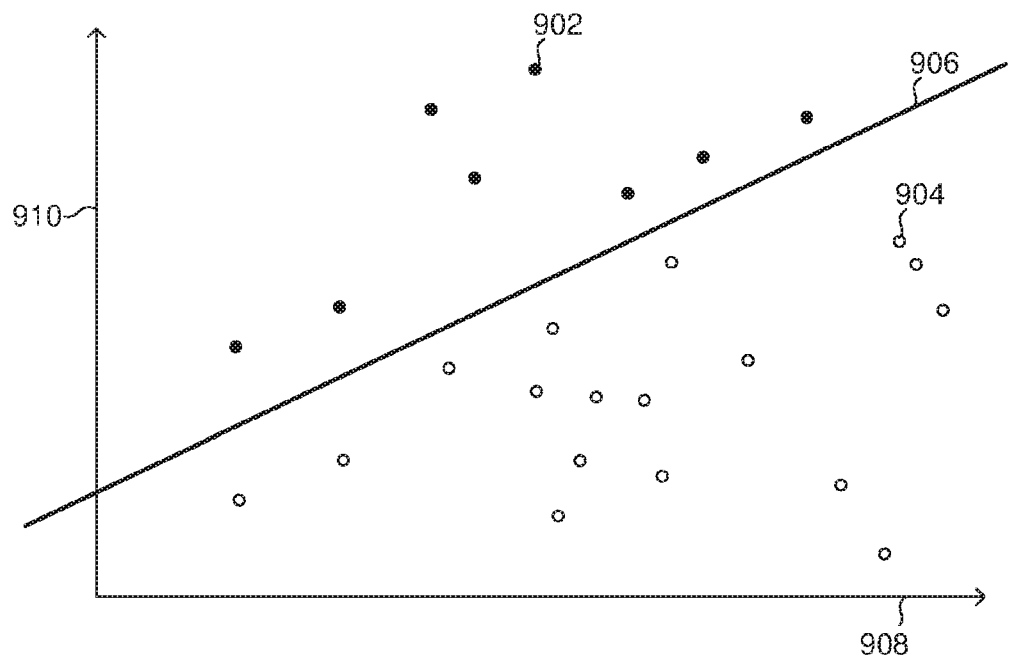
FIG. 9 illustrates a linear decision model.

Processor 202 then shows a notification in the task bar of the device and when the user opens the notification center, he sees a thumbnail of the game video, which captures his attention and he clicks on it. The downloaded news video starts playing. After it finishes, the system launches the game application so the user can see the new game content available to him FIG. 9 illustrates a linear decision model 900, where each circle represents a historical notification that has been displayed in the past. Solid disks, such as 902, represent notifications with which the user interacted while empty circles, such as 904, indicate notification with which the user did not interact.

A first axis 908 may, for example, represent the time of day from 6 am to 10 pm while a second axis 910 may, for example, represent the latitude of the user in the case where the user travels from north to south when commuting to work. A conceptual line 906 represents the threshold on a linear addition of the time of day with the latitude, which indicates that the user is more likely to interact with the notification earlier in the day and further south, that is, closer to work. When processor 202 receives new sensor data, processor 202 determines on which side of the line the new sensor data lies and if it lies on the side of the solid disks, processor 202 outputs the notification.

It is noted that outputting the notification may mean displaying the notification, such as notification 214 in FIG. 2, generating an audio signal indicative of the content item, such as by playing a pre-selected ringtone, or generating a tactile signal indicative of the content item, such as by activating a vibration alarm.

Learning procedures may be implemented by importing existing libraries and using API calls to these libraries in the software installed on program memory 204.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximizing" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

What is claimed is:

1. A method for displaying notifications for a content item on a mobile device to a user, the method comprising:
receiving meta-data associated with the content item;
receiving historical data corresponding to the meta-data of the content item, wherein the historical data is indicative of historical interactions by the user with historical notifications at prior times in a historical context, the historical notifications having been displayed on the mobile device at the corresponding prior times in the historical context by an application installed on the mobile device via a visual component usable by multiple applications installed on the mobile device, wherein the visual component allows the user to open the application by selecting one of the historical notifications in the historical context;
receiving context data indicative of a current context of the mobile device;
evaluating a decision model, that is stored on a data store and that comprises model parameters based on the historical data, for the meta-data and sensor data, to determine a first value based on the meta-data, the context data and the historical data, the first value indicative of a current likelihood of the user interacting with a notification that is based on the meta-data in the current context;

sending first output data based on the first value to an output module to allow selectively outputting the notification based on the current likelihood;

receiving input data indicative of a user interaction in relation to the notification;

determining updated model parameters based on the sensor data and the meta-data; and storing the updated model parameters on the data store to allow evaluating the model comprising the updated model parameters.

2. The method of claim 1, wherein receiving context data comprises receiving sensor data from one or more sensors associated with the mobile device.

3. The method of claim 2, wherein receiving sensor data comprises receiving physiological data related to the user from one or more physiological sensors.

4. The method of claim 1, further comprising determining the first output data based on the first value such that the first output data indicates whether the current likelihood satisfies a predetermined condition for outputting the notification.

5. The method of claim 4, further comprising selectively outputting by the output module the notification based on the first output data.

6. The method of claim 1, wherein sending the first output data comprises sending the first output data to a mobile device.

7. The method of claim 1, wherein the historical data indicative of historical user interactions comprises historical sensor data associated with the historical user interactions.

8. The method of claim 1, wherein the meta-data is indicative of one or more of:
a type of the content item;
a category of the content item;
a size of the content item;
a generation date of the content item; or
an expiry date of the content item.

9. The method of claim 1, wherein the sensor data is related to a user control of the mobile device.

10. The method of claim 1, wherein:
receiving meta-data comprises receiving meta-data by a processing computer device;
receiving context data comprises receiving context data by the processing computer device;
determining the first value comprises determining the first value by the processing computer device; and
sending the first output data to an output module comprises sending the first output data from the processing computer device to an output module of the mobile device.

11. The method of claim 1, wherein the content item includes a video.

12. The method of claim 11, further comprising;
monitoring user input to detect a user interaction in relation to the notification; and
upon detecting the user interaction in relation to the notification outputting the video on the mobile device.

13. The method of claim 10, further comprising;
determining a second value based on the meta-data, the historical data, and the sensor data, the second value being indicative of whether a download opportunity is currently present; and sending second output data based on the second value to a download module to allow selectively downloading content data associated with the content item based on whether a download opportunity is currently present.

14. The method of claim 13, further comprising downloading by the downloading module the content data from a content server onto the mobile device.

15. The method of claim 14, wherein receiving the sensor data, determining the first value and sending the first output data are performed upon completion of the downloading.

16. The method of claim 15, further comprising:
determining a third value indicative of a point in time or period in time when the user is likely to interact with the notification, wherein the second output data is based on the point in time or the period in time to allow completion of the downloading before the point on time or the period in time.

17. A non-transitory computer readable medium with an executable program stored thereon that when executed causes a computer to perform the method of claim 1.

18. A computer system for displaying notifications for a content item on a mobile device to a user, the computer system comprising:
an input port configured to:
receive meta-data associated with the content item and context data indicative of a current context of the mobile device, and
receive historical data corresponding to the meta-data of the content item, wherein the historical data is indicative of historical interactions by the user with historical notifications at prior times in a historical context, the historical notifications having been displayed on the mobile device at the corresponding prior times in the historical context by an application installed on the mobile device via a visual component usable by multiple applications installed on the mobile device, wherein the visual component allows the user to open the application by selecting one of the historical notifications in the historical context;

a processor configured to:
evaluate a decision model, that is stored on a data store and that comprises model parameters based on the historical data, for the meta-data and sensor data, to determine a first value based on the meta-data, the context data and the historical data, the first value being indicative of a current likelihood of the user interacting with a notification that is based on the meta-data in the current context;

send first output data based on the first value to an output port to allow selectively outputting the notification based on the current likelihood;

receive input data indicative of a user interaction in relation to the notification;

determine updated model parameters based on the sensor data and the meta-data; and store the updated model parameters on the data store to allow evaluating the model comprising the updated model parameters; and the output port configured to receive the first output data.

* * * * *